(12) United States Patent
Poduri et al.

(10) Patent No.: US 9,161,172 B2
(45) Date of Patent: Oct. 13, 2015

(54) MAP-BASED ADAPTIVE SAMPLING OF ORIENTATION SENSORS FOR POSITIONING

(71) Applicant: QUALCOMM Incorporated, San Diego, CA (US)

(72) Inventors: Sameera Poduri, Santa Clara, CA (US); Payam Pakzad, Mountain View, CA (US); Vinay Sridhara, Santa Clara, CA (US); Saumitra Mohan Das, Santa Clara, CA (US); Ayman Fawzy Naguib, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 475 days.

(21) Appl. No.: 13/670,306

(22) Filed: Nov. 6, 2012

(65) Prior Publication Data

US 2014/0129175 A1    May 8, 2014

(51) Int. Cl.
| | |
|---|---|
| G01P 13/00 | (2006.01) |
| G01C 9/00 | (2006.01) |
| H04W 4/02 | (2009.01) |
| G01C 21/00 | (2006.01) |
| G01C 21/16 | (2006.01) |

(Continued)

(52) U.S. Cl.
CPC ............. *H04W 4/028* (2013.01); *G01C 21/005* (2013.01); *G01C 21/165* (2013.01); *G01C 21/206* (2013.01); *G01C 22/006* (2013.01); *G01S 5/02* (2013.01); *G01S 5/0257* (2013.01); *G01S 19/49* (2013.01); *H04W 64/006* (2013.01); *H04W 4/026* (2013.01)

(58) Field of Classification Search
CPC .. G01C 21/005; G01C 21/165; G01C 21/206; G01C 22/006; G01S 19/49; G01S 5/00; G01S 5/02; G01S 5/0257; H04W 4/026; H04W 4/028; H04W 64/006
USPC ........... 702/92, 96, 141, 142, 150; 455/456.1, 455/552.1; 340/8.1; 705/14.58
See application file for complete search history.

(56) References Cited

U.S. PATENT DOCUMENTS

| | | |
|---|---|---|
| 5,594,951 A | 1/1997 | Bellin |
| 5,604,708 A | 2/1997 | Helms et al. |

(Continued)

FOREIGN PATENT DOCUMENTS

| | | |
|---|---|---|
| EP | 2046087 A1 | 4/2009 |
| EP | 2072950 A2 | 6/2009 |

(Continued)

OTHER PUBLICATIONS

International Search Report and Written Opinion—PCT/US2013/063994—ISA/EPO—Feb. 18, 2014.

(Continued)

*Primary Examiner* — John H Le
(74) *Attorney, Agent, or Firm* — Kilpatrick Townsend & Stockton LLP

(57) ABSTRACT

Techniques are provided for adaptively sampling orientation sensors in positioning systems based on location (e.g., map) data. Embodiments can enable a device to use location, direction, and/or location information to anticipate an expected change in motion. The embodiments can then identify and prioritize a number of sampling strategies to alter sampling rates of orientation sensors, and implement at least one strategy, based on priority.

44 Claims, 7 Drawing Sheets

(51) Int. Cl.
  *G01C 21/20* (2006.01)
  *G01C 22/00* (2006.01)
  *H04W 64/00* (2009.01)
  *G01S 19/49* (2010.01)
  *G01S 5/02* (2010.01)

(56) References Cited

U.S. PATENT DOCUMENTS

| | | |
|---|---|---|
| 5,714,870 A | 2/1998 | Dunstan |
| 5,848,364 A | 12/1998 | Ohashi |
| 5,883,594 A | 3/1999 | Lau |
| 5,947,775 A | 9/1999 | Yamamoto et al. |
| 5,953,677 A | 9/1999 | Sato |
| 6,097,958 A | 8/2000 | Bergen |
| 6,408,196 B2 | 6/2002 | Sheynblat et al. |
| 6,710,578 B1 | 3/2004 | Sklovsky |
| 7,057,372 B2 | 6/2006 | Chen et al. |
| 7,271,765 B2 | 9/2007 | Stilp et al. |
| 7,359,713 B1 | 4/2008 | Tiwari |
| 7,783,302 B2 | 8/2010 | Hupp et al. |
| 7,848,270 B2 | 12/2010 | Hilmersson |
| 7,873,349 B1 | 1/2011 | Smith et al. |
| 7,953,459 B2 | 5/2011 | Kim et al. |
| 8,060,108 B1 | 11/2011 | Rayburn et al. |
| 8,072,379 B2 | 12/2011 | Gopinath |
| 8,195,468 B2 | 6/2012 | Weider et al. |
| 8,214,139 B2 | 7/2012 | Yonker et al. |
| 8,214,910 B1 | 7/2012 | Gossweiler, III |
| 8,472,973 B2 | 6/2013 | Lin et al. |
| 8,744,804 B2 | 6/2014 | Messenger et al. |
| 2001/0041960 A1 | 11/2001 | Hashida |
| 2003/0104849 A1 | 6/2003 | Arimitsu |
| 2004/0192330 A1 | 9/2004 | Gaal |
| 2004/0198386 A1 | 10/2004 | Dupray |
| 2005/0037775 A1 | 2/2005 | Moeglein et al. |
| 2005/0060088 A1 | 3/2005 | Helal et al. |
| 2005/0130677 A1 | 6/2005 | Meunier et al. |
| 2006/0125644 A1 | 6/2006 | Sharp |
| 2006/0255963 A1 | 11/2006 | Thompson et al. |
| 2007/0037610 A1 | 2/2007 | Logan |
| 2007/0089065 A1 | 4/2007 | Lane et al. |
| 2007/0178913 A1 | 8/2007 | Niemenmaa et al. |
| 2008/0162034 A1 | 7/2008 | Breen |
| 2009/0143018 A1 | 6/2009 | Anderson et al. |
| 2009/0164115 A1 | 6/2009 | Kosakowski et al. |
| 2009/0164120 A1 | 6/2009 | Boore et al. |
| 2009/0213004 A1 | 8/2009 | Rhodes et al. |
| 2009/0216438 A1 | 8/2009 | Shafer |
| 2009/0286549 A1 | 11/2009 | Canon et al. |
| 2010/0069062 A1 | 3/2010 | Horn et al. |
| 2010/0087230 A1 | 4/2010 | Peh et al. |
| 2010/0106603 A1 | 4/2010 | Dey et al. |
| 2010/0161831 A1 | 6/2010 | Haas et al. |
| 2010/0197321 A1 | 8/2010 | Kim et al. |
| 2010/0240391 A1 | 9/2010 | Povey |
| 2010/0241496 A1 | 9/2010 | Gupta et al. |
| 2011/0172906 A1 | 7/2011 | Das et al. |
| 2011/0177809 A1 | 7/2011 | Pakzad et al. |
| 2011/0178701 A1 | 7/2011 | Gupta et al. |
| 2011/0215903 A1* | 9/2011 | Yang et al. ............ 340/8.1 |
| 2011/0239026 A1 | 9/2011 | Kulik |
| 2011/0307891 A1 | 12/2011 | Orr et al. |
| 2012/0064922 A1 | 3/2012 | Podoloff et al. |
| 2012/0100895 A1 | 4/2012 | Priyantha et al. |
| 2012/0130632 A1 | 5/2012 | Bandyopadhyay et al. |
| 2012/0143495 A1 | 6/2012 | Dantu |
| 2012/0157113 A1 | 6/2012 | Brisebois et al. |
| 2012/0176525 A1 | 7/2012 | Garin et al. |
| 2012/0203453 A1 | 8/2012 | Lundquist et al. |
| 2012/0268249 A1 | 10/2012 | Kansal et al. |
| 2013/0017840 A1 | 1/2013 | Moeglein et al. |
| 2013/0085861 A1* | 4/2013 | Dunlap ............ 705/14.58 |
| 2014/0045547 A1* | 2/2014 | Singamsetty et al. ..... 455/552.1 |
| 2014/0106677 A1 | 4/2014 | Altman |
| 2014/0107919 A1 | 4/2014 | Venkatraman et al. |

FOREIGN PATENT DOCUMENTS

| | | |
|---|---|---|
| EP | 2270535 A2 | 1/2011 |
| EP | 2293016 A2 | 3/2011 |
| EP | 2648389 A1 | 10/2013 |
| JP | 9005102 A | 1/1997 |
| WO | WO-2010025467 A1 | 3/2010 |
| WO | WO-2011107652 A1 | 9/2011 |
| WO | WO-2012001215 A1 | 1/2012 |

OTHER PUBLICATIONS

International Search Report and Written Opinion—PCT/US2012/068279—ISA/EPO—Apr. 8, 2013.

Kong J., et al., "Ubiquitous Interacting Object: A Distributed and Localized Approach to Building Ubiquitous Computing Applications," ACM Transactions on Interactive Intelligent Systems, 2013, pp. 1-25.

Application as Filed in U.S. Appl. No. 13/325,698, Arnold J Gum, Location and event triggered navigation dormancy and wakeup, dated Dec. 14, 2011.

* cited by examiner

MAP-BASED ADAPTIVE SAMPLING OF ORIENTATION SENSORS FOR POSITIONING

BACKGROUND

Positioning systems can utilize various types of information to calculate location of an object. Such information can include dead reckoning calculations that can utilize sensor information from the device to be located. For example, an indoor positioning system may use dead reckoning calculations based on sensor data gathered from a user's cell phone to determine the location of the user within a building. Unfortunately, these sensors can consume a lot of power, which can be a problem for cell phones and other mobile devices with a limited power budget. Furthermore data from certain sensors may not be particularly useful to determine certain types of motion.

SUMMARY

Embodiments of the present invention are directed adaptively sampling orientation sensors in positioning systems based on "map data" and/or other information regarding a particular location. Embodiments can, for example, enable mobile devices, computer servers, and/or other systems to use location, direction, and/or location information to anticipate an expected change in motion (e.g., a change in direction). The embodiments can then identify and prioritize a number of sampling strategies to alter sampling rates of orientation sensors, and implement at least one strategy, based on priority.

An example method for adaptively adjusting orientation sensor sampling of a mobile device in a positioning system, according to the description, can include determining a location of the mobile device, determining a direction in which the mobile device moves. The example method can also include determining an expected change in movement based on the determined location, and the determined direction. Finally, the example method can include automatically adjusting, with a processing unit, a sampling rate of at least one orientation sensor of the mobile device based on the expected change in movement.

An example mobile device configured to adaptively adjust orientation sensor sampling for position determination, according to the description, can include at least one orientation sensor, a wireless communication interface, a memory, and a processing unit. The processing unit can be communicatively coupled with the at least one orientation sensor, the wireless communication interface, and the memory. The processing unit can be configured to determine a location of the mobile device, and determine a direction in which the mobile device moves. The processing unit further can be configured to determine an expected change in movement based on the determined location, and the determined direction. Finally, the processing unit can be configured to adjust a sampling rate of the at least one orientation sensor of the mobile device based on the expected change in movement.

An example non-transitory computer readable medium, according to the description, can have instructions stored thereon for causing a processing unit to determine a location of a mobile device, and determine a direction in which the mobile device moves. The instructions can include instructions for causing a processor to determine an expected change in movement based on the determined location, and the determined direction. Finally, instructions can include instructions for causing a processor to adjust a sampling rate of at least one orientation sensor of the mobile device based on the expected change in movement.

An example system for adaptively adjusting orientation sensor sampling of a mobile device in a positioning system, according to the description, can include means for determining a location of the mobile device, and means for determining a direction in which the mobile device moves. The system further can include means for determining an expected change in movement based on the determined location, and the determined direction. The system also can include means for adjusting a sampling rate of at least one orientation sensor of the mobile device based on the expected change in movement.

Items and/or techniques described herein may provide one or more of the following capabilities, as well as other capabilities not mentioned. Techniques can provide for increased power efficiency and/or positioning accuracy. Embodiments can also utilize crowdsourcing and self-sourcing techniques to further increase the accuracy and efficiency of the positioning systems described herein. These and other embodiments, along with many of its advantages and features, are described in more detail in conjunction with the text below and attached figures.

DETAILED DESCRIPTION

Figure 1:
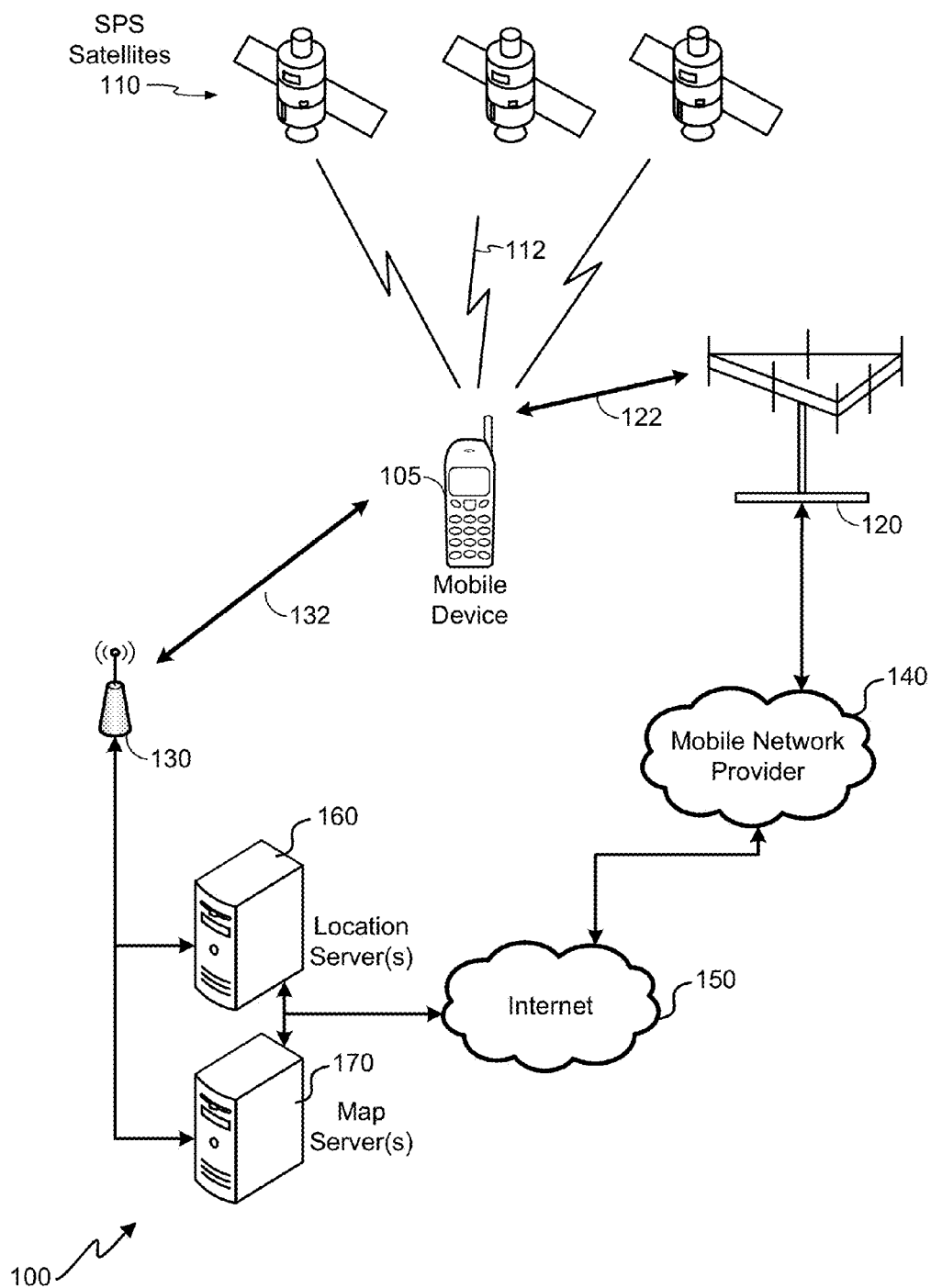
FIG. 1 is a simplified illustration of a positioning system, according to one embodiment.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

Different techniques may be used to estimate the location of a mobile device such as a cell phone, personal digital assistant (PDA), tablet computer, personal media player, gaming device, and the like, according to the desired functionality of the mobile device. For example, some mobile devices may process signals received from a Satellite Positioning System (SPS) to estimate their locations for navigation, social media location information, location tracking, and the like. However, sometimes there are certain areas where navigation signals from an SPS may not be available, such as in certain indoor locations.

A mobile device may estimate its location within an area where navigation signals transmitted from an SPS are not available. Positioning systems (e.g., indoor positioning systems) can enable a mobile device to transmit a signal to an access point and measure a length of time until a response signal from the access point is received. (As provided herein, an access point may comprise a device that allows wireless communication devices to communicate with a network.) A range from the mobile device to the access point may be determined based upon the measured length of time between transmission of a signal from the mobile device and receipt of a response signal at the mobile device (e.g., round trip time (RTT)). Alternatively, signal strength of a signal received from the access point may be measured and a range from the mobile device to the access point may be estimated based on the measured signal strength (e.g., received signal strength indication (RSSI)). In this manner, a location of the mobile device can be estimated.

Additional data can complement the location estimates by providing additional information regarding movement that can be used, for example, in dead reckoning calculations. This additional data can come from one or more orientation sensors such as a gyroscope, a magnetometer, an accelerometer, a camera, and the like. Other sensors, such as an altimeter, may also be used. Problematically, however, sampling these various sensors can quickly drain the battery of a mobile device. Furthermore, certain sensor information may not be useful during certain movements. For example, if a user carrying the mobile device is walking in a straight line, information from an accelerometer may be helpful to determine a step count, but information from a mobile device's gyroscope may not be useful. And because a gyroscope can consume approximately 8 to 10 times the amount of energy that an accelerometer does, it would be beneficial to reduce the sampling rate of the gyroscope, or even completely power it off, in order to extend the battery life of the mobile device. Embodiments provided herein provide for such intelligent sensor sampling by utilizing maps and/or other location information in mobile device positioning.

FIG. 1 is a simplified illustration of a positioning system 100, according to one embodiment. The positioning system can include a mobile device 105, SPS satellites, base transceiver station(s) 120, mobile network provider 140, access point(s) 130, location server(s) 160, map server(s) 170, and the Internet 150. It should be noted that FIG. 1 provides only a generalized illustration of various components, any or all of which may be utilized as appropriate. Furthermore, components may be combined, separated, substituted, and/or omitted, depending on desired functionality. A person of ordinary skill in the art will recognize many modifications to the components illustrated.

In the positioning system 100, a location of the mobile device 105 can be determined in any of a variety of ways. In some embodiments, for example, the location of the mobile device 105 can be calculated using triangulation and/or other positioning techniques with information transmitted from SPS satellites 110. In these embodiments, the mobile device 105 may utilize a receiver specifically implemented for use with the SPS that extracts position data from a plurality of signals 112 transmitted by SPS satellites 110. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

Embodiments may also use communication and/or positioning capabilities provided by base transceiver stations 120 and mobile network provider 140 (e.g., a cell phone service provider), as well as access point(s) 130. Communication to and from the mobile device 105 may thus also be implemented, in some embodiments, using various wireless communication networks. The mobile network provider 140, for example, can comprise such as a wide area wireless network (WWAN). The access point(s) 130 can be part of a wireless local area network (WLAN), a wireless personal area network (WPAN), and the like. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may implement Long Term Evolution (LTE), LTE Advanced, and so on. LTE, LTE Advanced, GSM, and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

Mobile network provider 140 and/or access point(s) 130 can further communicatively connect the mobile device 105 to the Internet 150. Other embodiments may include other networks in addition, or as an alternative to, the Internet 150. Such networks can include any of a variety of public and/or private communication networks, including wide area network (WAN), local area network (LAN), and the like. Moreover, networking technologies can include switching and/or packetized networks utilizing optical, radio frequency (RF), wired, satellite, and/or other technologies.

As described previously, the access point(s) 130 be used for wireless voice and/or data communication with the mobile device 105, as well as independents sources of position data, e.g., through implementation of trilateration-based procedures based, for example, on RTT and/or RSSI measurements. Further example embodiments of determining position of a mobile device using access point(s) 130 are provided in U.S. patent application Ser. No. 13/398,653, entitled "MEASUREMENTS AND INFORMATION GATHERING IN A WIRELESS NETWORK ENVIRONMENT," the content of which is hereby incorporated by reference in its entirety. The access point(s) 130 can be part of a WLAN that operates in a building to perform communications over smaller geographic regions than a WWAN. The access point (s) 130 can be part of a WiFi network (802.11x), cellular piconets and/or femtocells, Bluetooth network, and the like. The access point(s) 130 can also form part of a Qualcomm indoor positioning system (QUIPS™). Embodiments may include any number of access point(s) 130, any of which may be a movable node, or may be otherwise capable of being relocated.

The mobile device 105 can include a variety of sensors, some or all of which can be utilized in dead reckoning calculations to complement and/or further improve the accuracy of location determinations. These dead reckoning calculations can be made by the mobile device 105 and/or the location server(s) 160. Sensors may be intelligently sampled to provide the necessary information for dead reckoning calculations, while keeping power consumption of the mobile device at a minimum.

To facilitate the intelligent sampling of the sensors, map server(s) 170 can provide location information such as maps, motion models, context determinations, and the like, which can be used by the location server(s) 170 and/or mobile device 105 to determine a sampling strategy for one or more of the mobile device's sensors. In some embodiments, for example, map server(s) 170 associated with a building can provide a map to a mobile device 105 when the mobile devices approaches and/or enters the building. The map data, which can comprise a layout of the building (indicating physical features such as walls, doors, windows, etc.), can be sent to the mobile device 105 from the map server(s) 170 via the access point(s) 130, and/or via the Internet 150, mobile network provider 140, and base transceiver station(s) 120. Alternatively, sensor and/or derivative data (e.g., pedometer count), can be sent to the map server(s) 170 and/or location server(s) 160 for determination of the location of the mobile device 105.

Figure 2:
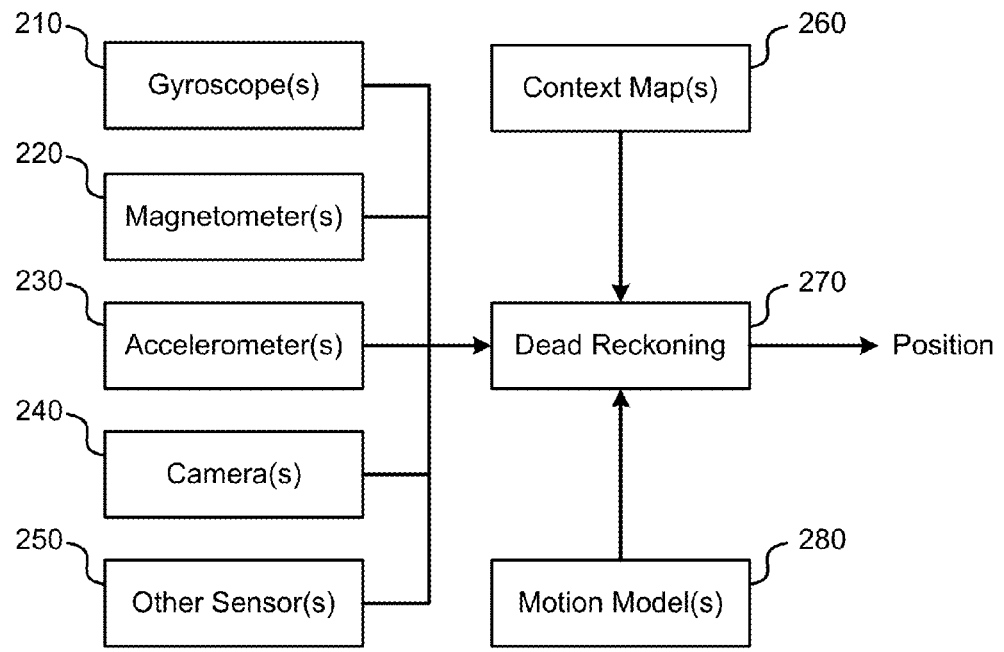
FIG. 2 is a simplified input/output diagram illustrating how embodiments can utilize sensor and other information in dead reckoning calculations to provide a position output.

FIG. 2 is a simplified input/output diagram illustrating how embodiments described herein can utilize sensor and other information in dead reckoning calculations to provide a position output. A mobile device can have one or more orientation sensors, including one or more gyroscope(s) 210, magnetometer(s) 220 (e.g., compass(es)), accelerometer(s) 230, and/or camera(s) 240. Data from one or more other sensor(s) 250 can also be used. Other sensor(s) can include, for example, altimeter(s), microphone(s), light sensor(s), proximity sensor(s), and the like.

As stated above, dead reckoning 270 can be calculated by the mobile device 105 and/or the location server(s) 160. Depending on the desired functionality, the dead reckoning calculation can use raw sensor data and/or derivative data. Derivative data can include summarized data or conclusions made from the raw data. For example, derivative data can include a calculated number of steps based on accelerometer data, the angle of a turn based on gyroscope data, and the like. Some embodiments may use derivative data in instances where the transmittal of such data can further conserve power of the mobile device. For example, in embodiments where dead reckoning 270 is computed on a location server 160, the mobile device may transmit derivative sensor data to the location server 160 to make the calculation.

In addition to sensor information, dead reckoning 270 can also utilize one or more motion model(s) 280. Motion model(s) 280 can comprise location-specific information regarding motion of a user at a particular location. These motion models 280 may be associated with a map, although map data may be inferred from such models. For example, motion models 280 that indicate movement at a particular location is restricted to a single dimension (e.g., forward or backward in a certain direction) may indicate a hallway or similar physical structure.

Context map(s) 260 can also be used in dead reckoning calculations. Context maps 260 can include contextual information, such as a location type, associated with a particular location and/or physical structure associated with a map. For example, a context map 260 can indicate that certain locations are part of a hallway, in which motion is likely to be limited to a single dimension. Locations in a break room, on the other hand, may indicate that movement may be in any of a wide variety of directions. The context map(s) 260 may also indicate an expected activity engaged in by a user of the mobile device based on the location. For example, the user may be expected to jog or run when on an indoor track.

Motion model(s) 280 and/or context map(s) 260 associated with a building may be stored and/or updated by a map server 170 associated with the building. For embodiments in which dead reckoning 270 is calculated by the mobile device 105, the motion model(s) 280, context map(s) 260, and/or other location information may be uploaded to and stored on a memory of the mobile device 105. Furthermore, motion model(s) 280, context map(s) 260, and/or other location information may be updated to reflect movement information from a plurality of mobile devices (i.e., "crowd sourced"). Historical information from a single mobile device can also be used to update motion model(s) 280, context map(s) 260, and/or other location information (e.g., "self-sourced"). Historical information can be used to update motion model(s) 280, context map(s) 260, and/or other location information specific to a particular user, and/or may be used to modify general motion model(s) 280 and/or context map(s) 260 for multiple or all users. Depending on the desired functionality, the mobile device 105 and/or the location server(s) 160 can use movement information to update the motion model(s) 280, context map(s) 260, and/or other location information. Such functionality can provide for the mobile device 105 and/or location server(s) 160 communicating with one or more other mobile devices. In this manner, motion model(s) 280 and/or context map(s) 260 can evolve over time, "learning" from the movement of one or more mobile devices. For example, a motion model might learn over time that there is a 97% likelihood that a user traveling down a hallway will continue to go straight, rather than turn around or stop. This knowledge can be used to determine a sampling strategy for sampling certain sensors of the mobile device.

Figure 3:
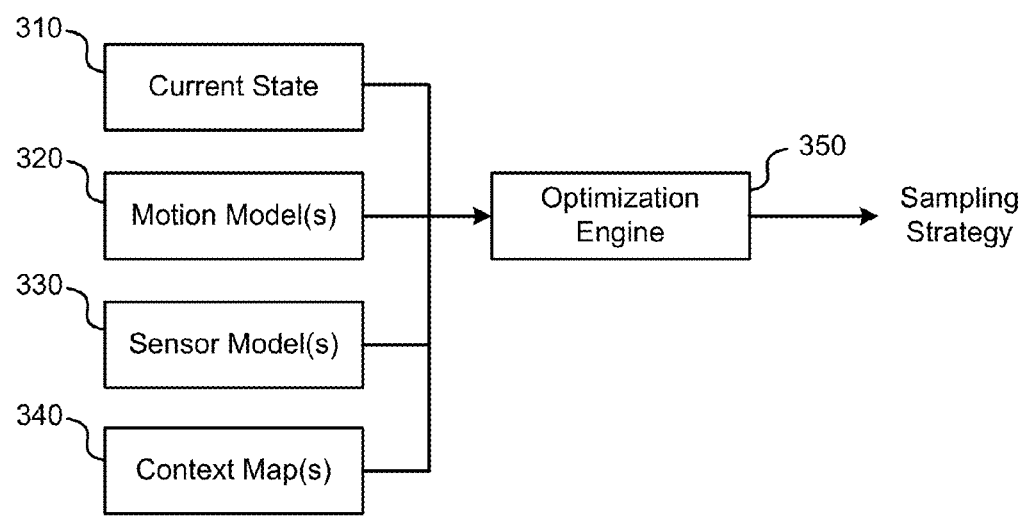
FIG. 3 is a simplified input/output diagram illustrating how embodiments can determine a sampling strategy based on information regarding a current state, motion model(s), and/or sensor model(s).

FIG. 3 is a simplified input/output diagram illustrating how embodiments described herein can use an optimization engine 350 to determine a sampling strategy based on information regarding a current state 310, motion model(s) 320, context map(s) 340, and/or sensor model(s) 330. Depending on the embodiment, additional factors may impact a sampling strategy, and/or some of the illustrated components may be omitted. Here, the optimization engine 350 can include any combination of hardware and/or software configured to determine a sampling strategy based on information such as the information types illustrated in FIG. 3. The optimization engine 350 can be executed by and/or located on a mobile device 105, location server(s) 160, and/or other computing device.

In FIG. 3, motion model(s) 320 and context map(s) 340 can be the same or similar to corresponding components (i.e., items 280 and 260, respectively) of FIG. 2 used in determining a position. Again, these components may be crowd sourced and/or self-sourced, and may evolve over time to help improve accuracy and efficiency of a positioning system. Here, however, the optimization engine 350 can utilize motion model(s) 320 and/or context map(s) 340 to determine an expected change in motion and output a sampling strategy accordingly. For example, motion model(s) 320, context map(s) 340, and/or other location data (not shown) can be used to determine whether a mobile device is coming to a location at which the mobile device may be taken any of a variety of directions. In such a case, a sampling strategy may be to start or increase sampling of a gyroscope.

Information regarding a current state 310 of the mobile device also can be used to determine a sampling strategy. The current state 310 can include an estimated location, heading (i.e., a direction of travel), time of day, and/or battery level of the mobile device. Additionally or alternatively, the current state 310 can include an activity of a user of the mobile device, such as walking, running, sitting, standing, etc. The current state 310 may also include an indication of which sensors are currently being utilized. In such cases, the optimization engine 350 may identify a sampling strategy that takes advantage of sensors being used by the mobile device, for example, by other applications. In such cases, a sampling strategy may not require any additional and/or different sampling, thereby preventing any additional power usage of the mobile device.

The one or more sensor model(s) 330 can include information that can enable the optimization engine 350 to adequately weigh the costs and benefits of employing different sampling strategies. That is, the sensor model(s) 330 can provide the expected information gain related to a sensor and/or sampling strategy, as well as an indication of the energy cost associated with that sensor and/or sampling strategy. In one embodiment, for example, the sensor model(s) 330 can include the available sampling strategies for a mobile device, along with the expected information gain and energy cost. Because a mobile device can have multiple sensors, and because each sensor can be sampled at different rates, embodiments could have many available sampling strategies for any given scenario. Embodiments can include, for example, 5, 10, 15, 20, 30, 50, or more sampling strategies. The optimization engine 350 can then select the sampling strategies that would provide the necessary information, and, from those selected sampling strategies, pick the strategy with the lowest energy cost, in light of the current state of the mobile device and/or other factors.

Sampling strategies can be used to exploit the strengths of certain sensors. For example, an accelerometer can be used as a pedometer to help determine whether the user is walking. The accuracy and energy consumption can vary, depending on the sampling rate. In some embodiments, the sampling of an accelerometer can be between 15 Hz and 100 Hz. Other embodiments may include sampling at higher and/or lower rates. Where it is determined that a user is likely going to walk in a single direction without turning, sampling strategies may include a strategy in which only the accelerometer is being sampled.

A magnetometer can be sampled when it is determined that a user is likely to change direction. Magnetometers are configured to measures a magnetic field intensity and/or direction, and may, in some embodiments, measure absolute orientation with respect to the magnetic north, which can be converted to orientation with respect to true north. In some implementations, micro-electro-mechanical systems (MEMS)-based magnetometer may be used. A mobile device may utilize other types of magnetometers such as Hall Effect magnetometers, rotating coil magnetometers, etc. in place of, or in addition to, the MEMS-based implementations. Because magnetic anomalies that may cause large errors in magnetometers, the use and/or calibration of a magnetometer may be based on knowledge of the existence (and level) of magnetic interference and/or other magnetic fields. Depending on desired functionality, the sampling rate of the magnetometer in some embodiments is approximately 10 Hz, although it can be increased or decreased depending on desired functionality.

A gyroscope also can be sampled when it is determined that a user is likely to turn or change direction. When compared with a magnetometer, a gyroscope can provide more accuracy, but requires more energy usage. Thus, sampling strategies that include gyroscopes may be implemented where a change in motion may include a handful of directional changes. A gyroscope can be based on MEMS technology, and may be a single-axis gyroscope, a double-axis gyroscope, or a 3-D gyroscope configured to sense motion about, for example, three orthogonal axes. Other types of gyroscope may be used in place of, or in addition to MEMS-based gyroscope. In some embodiments, sampling strategies can include a sampling rate of the gyroscope between 50 Hz and 400 Hz. Other embodiments may include higher and/or lower sampling rates, depending on desired functionality.

A camera also can be utilized as an orientation sensor that may provide useful information when it is determined that a user is likely to turn or change direction. A camera typically uses far more energy than a magnetometer or gyroscope, but may be far more accurate in certain situations. Where movement of a user could include any of a large variety of directions (e.g., when a user enters an open room or other open space), a camera can be used to take optical flow measurements to provide helpful orientation information. In some embodiments, sampling strategies can include a sampling rate of the camera between 15 Hz and 30 Hz (i.e., 15-30 frames per second (FPS)). Other embodiments may include higher and/or lower sampling rates, depending on desired functionality. Although the camera does take much more energy than other sensors, for situations in which a camera may already be in use (e.g., augmented reality applications), use of camera data for use in location determination may use little energy beyond that which is already being used.

Figure 4A:
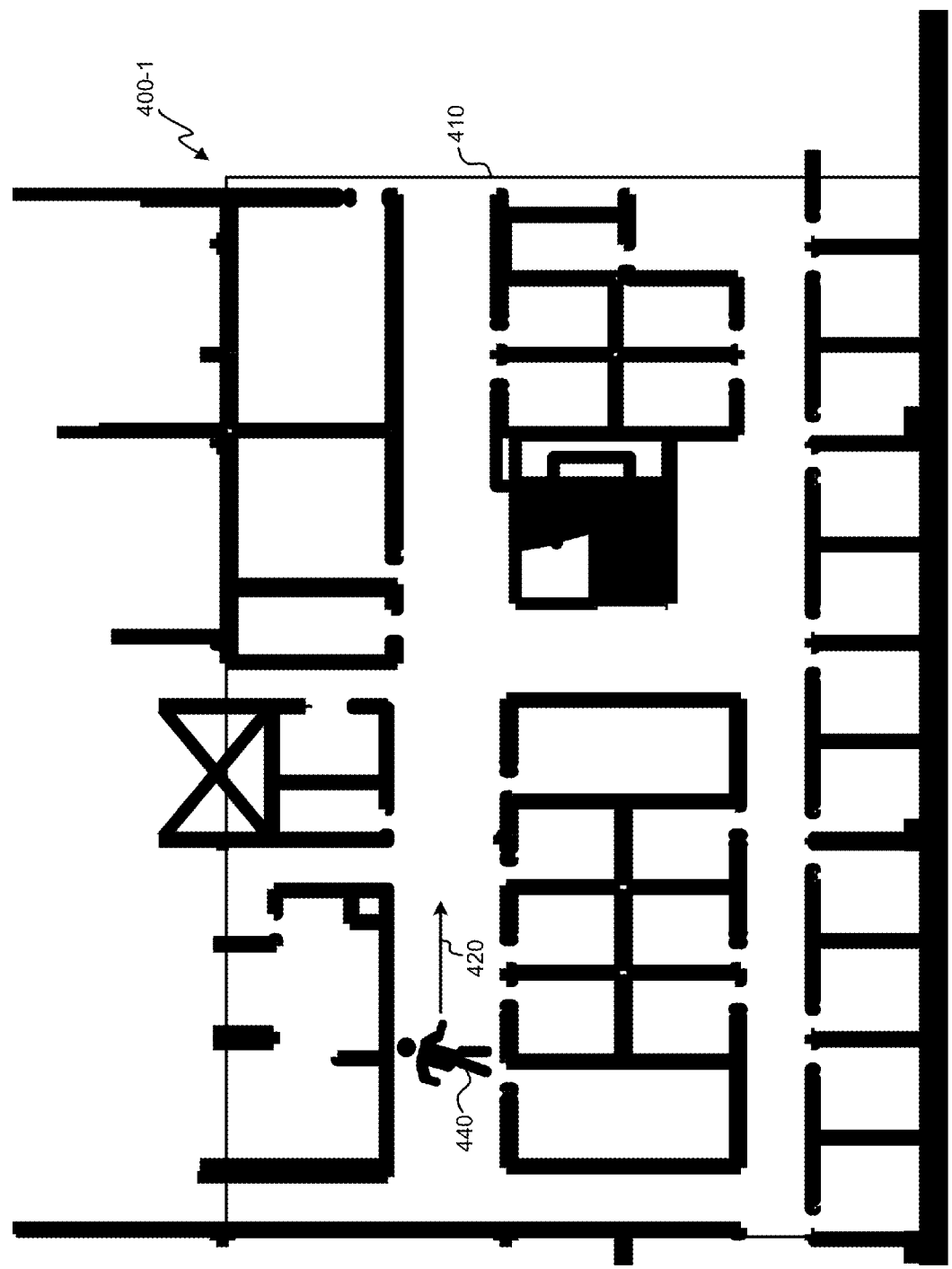
FIGS. 4A and 4B illustrate scenarios in which sampling strategies can be utilized.

As indicated above sampling strategies can vary, depending on the expected change in motion. To illustrate, FIG. 4A shows a portion of a building layout 410 illustrating a first scenario 400-1. A user 430 carrying a mobile device 105 (not shown) moves in a direction 420 down a hallway. Motion model(s) 320, context map(s) 340, and/or other location information (e.g., a simple layout of the building, as shown) can be used to determine whether the user 430 is going to change motion (e.g., stop, move in a different direction, etc.), or continue along the current direction 420. Because the user is walking down a hallway, location information likely indicates that no change in motion is expected, therefore there is no need to change the sampling strategy currently used.

Figure 4B:
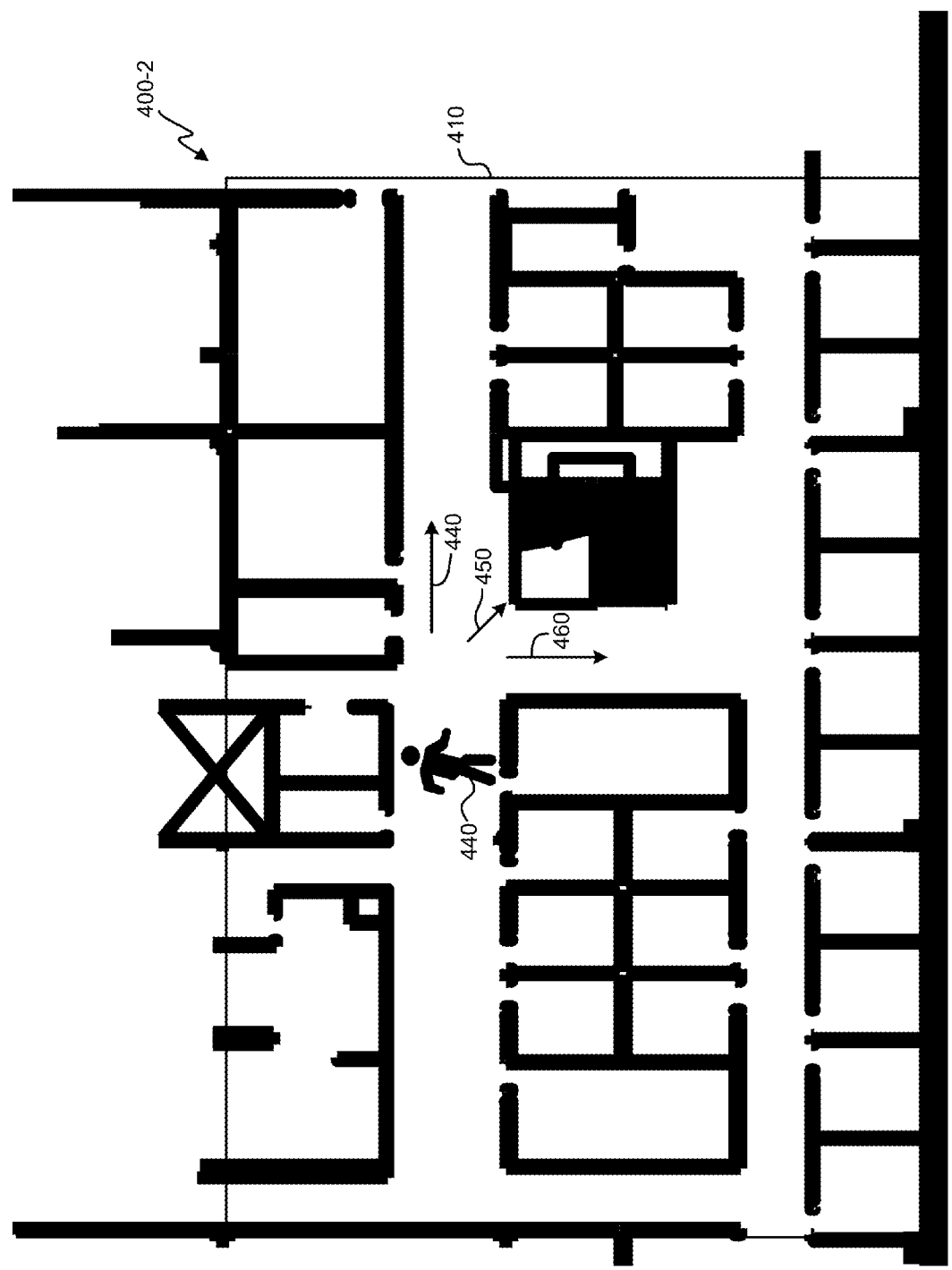

FIG. 4B illustrates a second scenario 400-2 in which the user 430 now approaches a junction. Again, motion model(s) 320, context map(s) 340, and/or other location information can be used to determine the presence of the junction and/or a likelihood of a change in motion. The location information can indicate that the user 430 in this scenario 400-2 can (in addition to stopping or turning around) choose one of three directions: continuing in the same direction 440, turning right 460, or entering a stairway 450. In anticipation of this potential change in motion, the optimization engine can implement a sampling strategy to begin sampling, for example, a gyroscope. In this way, the gyroscope can begin sampling by the time the user 430 enters the junction and chooses a direction to follow. This "ramping up" of the sensors in anticipation of a change in motion can help ensure the accuracy of the sampling when the change in motion occurs.

Figure 5:
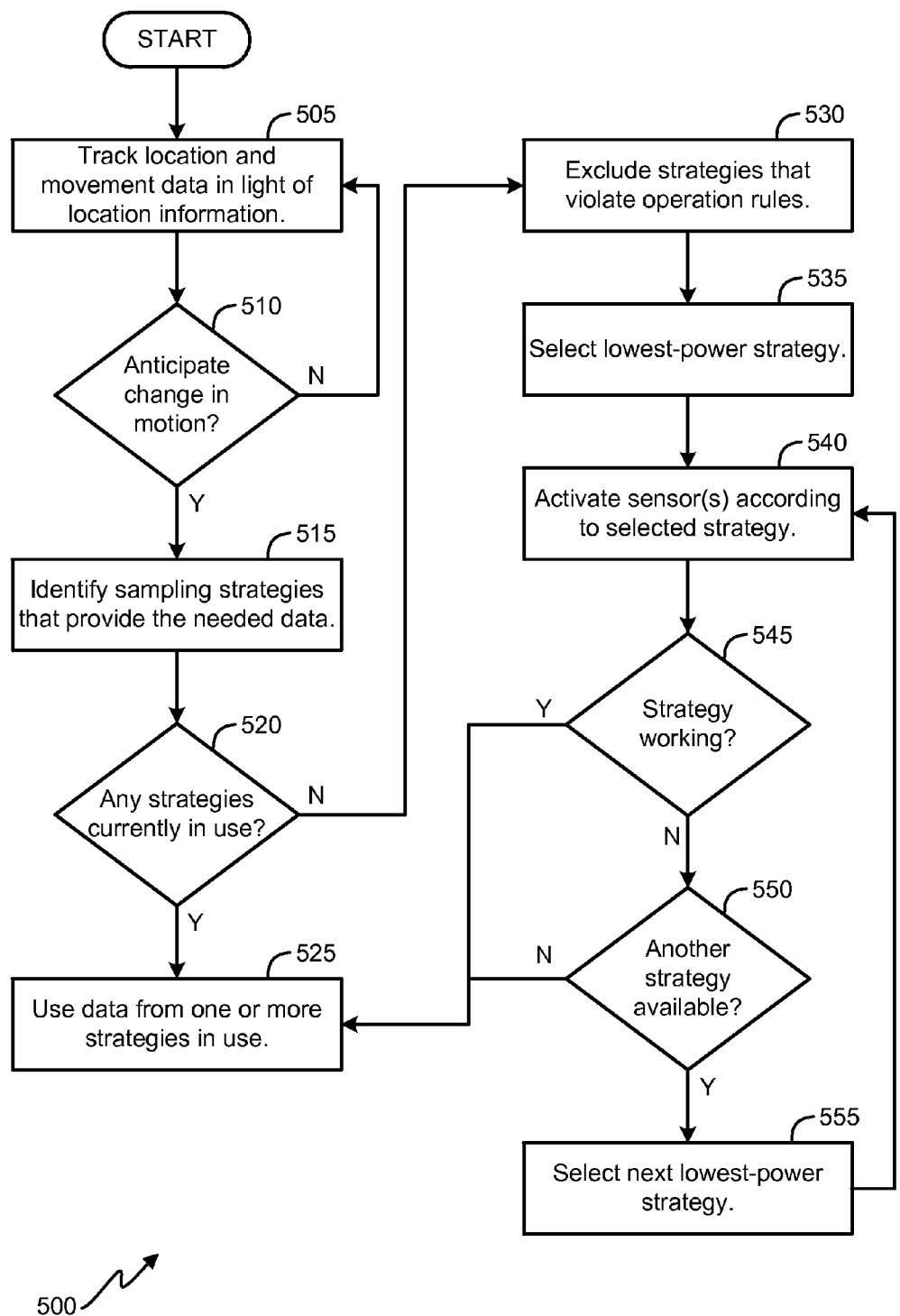
FIG. 5 is a flow chart of a process for adaptively adjusting orientation sensor sampling of a mobile device in a positioning system, according to one embodiment.

FIG. 5 is a flow chart of a process 500 for adaptively adjusting orientation sensor sampling of a mobile device in a positioning system, according to one embodiment. The process 500 can be executed by an optimization engine 350 of a mobile device 105, location server(s) 160, and/or other device. Means for performing some or all components shown in FIG. 5 can include, for example, specialized and/or generalized hardware programmed and/or otherwise configured to perform the components shown. Such means are described in further detail below with regard to FIG. 7.

The process 500 can begin by tracking location and movement data in light of location information (505). As indicated previously, location information can include motion model(s) 320, context map(s) 340, building layouts (or similar information indicating physical boundaries of a building), and the like. The location can include location estimates provided by, for example, RSSI and RTT measurements between the mobile device and an access point.

It is then determined whether a change in motion is anticipated (510). As shown above, location information, combined with a heading (i.e., direction) and location of the mobile device can enable a system to anticipate a change in motion. If there is no anticipated change, then the location and movement will continue to be tracked. Otherwise, sampling strategies are identified that provide the needed data to track the anticipated motion change (515). This can include determining, from a selection of available sampling strategies, a subset of sampling strategies that could provide the sensor information necessary to accurately track the anticipated change in motion. Such a determination can be based on a minimum required accuracy of one or more sensor(s), given the anticipated change in motion.

In this embodiment, it is first determined whether any of the available sampling strategies are currently in use (520). Some mobile devices capable of executing multiple applications at once—such as smart phones, tablets, personal media players, and other mobile computing devices—may execute applications that already sample sensors in a manner that conforms with one or more sampling strategies identified to provide the necessary sensor information. In such cases, the data from the one or more sampling strategies in use (525).

If a sampling strategy is not currently in use, the process can continue by excluding strategies that violate operation rules (530). Operation rules can include limitations provided by a device, user, application, etc. that can be imposed on the sampling strategies in certain situations. For example, certain buildings may include private information, in which case an operation rule may be to exclude any use of a camera. Another operation rule could be to operate within a restricted power budget if the battery level of the mobile device is below a certain threshold. Other such operation rules are contemplated. Thus, the subset of sampling strategies that could provide the sensor information necessary to accurately track the anticipated change in motion may be reduced by these operation rules. Of the remaining rules, the lowest-power strategy can then be selected (535), and the corresponding sensor(s) can be activated according to the selected strategy (540).

The process 500 can then enter a feedback loop in which it is determined whether the selected strategy is working (545). In some instances, for example, some sensors may not be useful. For example, if the mobile device is in a user's pocket or purse, data from a camera would provide little or no helpful information. Similarly, an altimeter may not be useful in situations in which air pressure is artificially changed, such as when a fan is circulating the air in a room. In such situations, it can be determined whether another strategy is available (550). If so, the next lowest-power strategy is selected (555), and the strategy is implemented by activating sensor(s) according to the selected strategy (540). This feedback process can continue until a strategy is found that works, or until no remaining strategies are available.

It should be appreciated that the specific steps illustrated in FIG. 5 provide an example process 500 for adaptively adjusting orientation sensor sampling of a mobile device in a positioning system. Alternative embodiments may include alterations to the embodiments shown. Furthermore, additional features may be added or removed depending on the particular applications. For example, embodiments may include a different order in which all available sampling strategies are reduced to the subset of sampling strategies that may ultimately be executed. One of ordinary skill in the art would recognize many variations, modifications, and alternatives.

Figure 6:
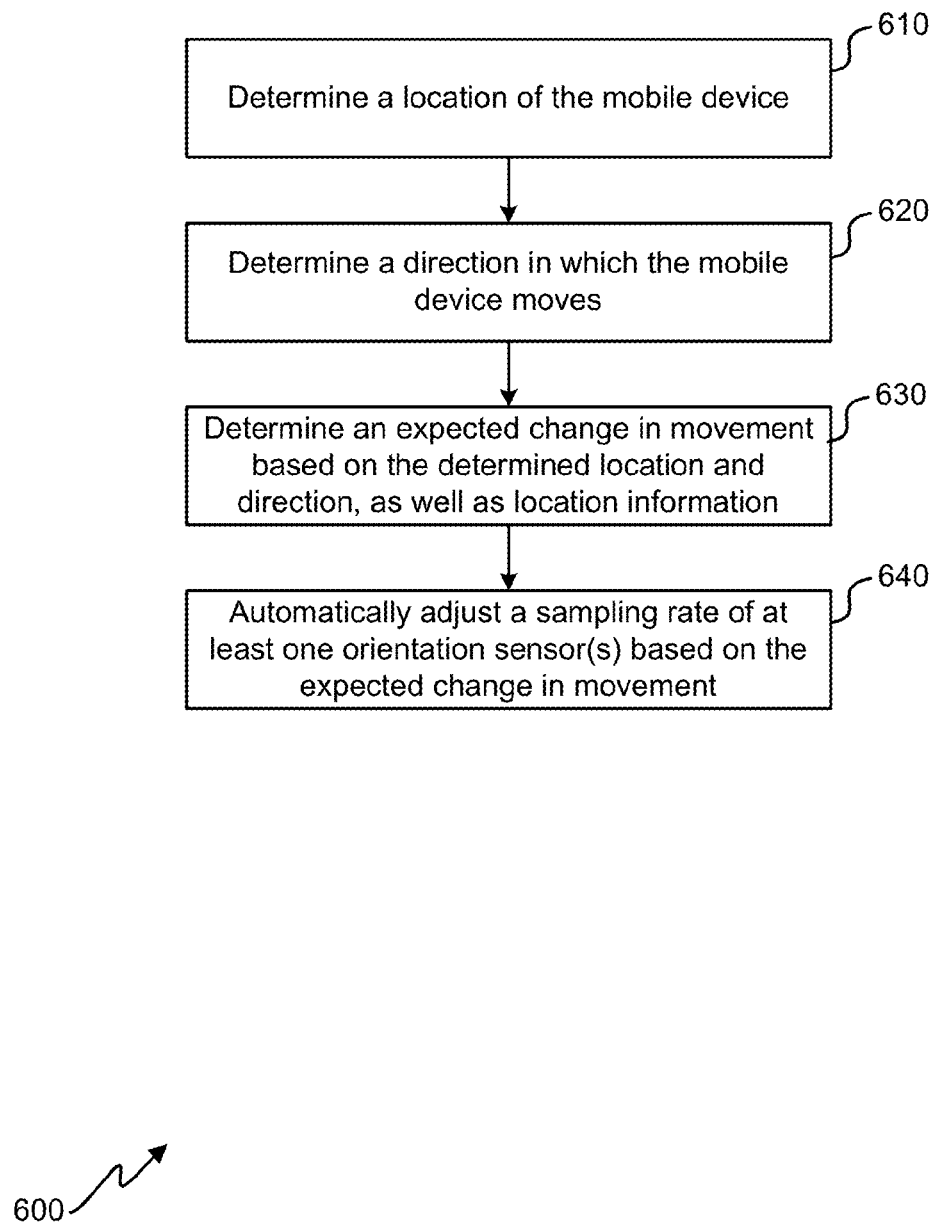
FIG. 6 is a simplified flow diagram of a process for adaptively adjusting orientation sensor sampling of a mobile device in a positioning system, according to another embodiment.

FIG. 6 is a simplified flow diagram of a process 600 for adaptively adjusting orientation sensor sampling of a mobile device in a positioning system, according to one embodiment. In some aspects, the process 600 of FIG. 6 is an implementation of components of the process 500 of FIG. 5. Similar to the process 500 of FIG. 5, the process 600 of FIG. 6, can be executed by an optimization engine 350 of a mobile device 105, location server(s) 160, and/or other device in a positioning system. Means for performing some or all blocks shown in FIG. 6 can include, for example, specialized and/or generalized hardware programmed and/or otherwise configured to perform the components shown. Such means are described in further detail below with regard to FIG. 7.

The process can include determining a location of the mobile device (610). Such a determination can include an estimation, approximation, calculation, etc. that can be used prior to and/or in conjunction with dead reckoning and/or other techniques in which orientation and/or other types of sensors are used. For example, as discussed previously regarding indoor position determination, RSSI and/or RTT measurements can be used to determine a distance between the mobile device and one or more access points. If the position(s) of the one or more access points is known, a location can be approximated using trilateration calculations and/or other techniques.

A direction in which the mobile device moves is also determined (620). The direction (e.g., a heading) and/or the location can be part of the information of a current state of the device, as described previously in relation to FIG. 3. The direction can be determined using a variety of techniques. For example, direction may be determined based on a detected change in position (e.g., a change from one known location to another). Additionally or alternatively, direction can be calculated and/or estimated using data from a gyroscope, magnetometer, camera, and/or other sensors. Direction may also be estimated using location information (e.g., map data) that can help indicate a direction in which the mobile device moves, which can be particularly helpful in an indoor environment. For example, a mobile device determined to be in a hallway can also be determined to have movement limited to certain directions.

An expected change in movement is then determined, based on the determined location and direction, as well as location information (630). As indicated previously, location information can include motion model(s) 320, context map(s) 340, building layouts (or similar information indicating physical boundaries of a building), and/or other information from which an expected change of motion can be determined. Moreover, such location information can be updated and/or change in time based on crowd sourcing and/or self-sourcing information. For example, it may be determined that a mobile device is moving down a hallway in a certain direction and is approaching an intersection in which a change in movement (e.g., a turn) may be expected. Location information can include not only map information, but also an indication that a change in motion is expected. Moreover, crowd sourcing and historical data can be used to modify and update this indication. For example, using crowd sourcing and/or historical data, it can be determined whether the mobile device is expected to move in one of two likely directions, four likely directions, continue without turning, and so on. The expected change in movement can impact the sampling strategy ultimately chosen to detect the expected change in movement. Furthermore, the expected change in movement may change over time, based on updated crowd sourcing and/or historical data. Furthermore, an expected change in direction may be determined based on user-specific information, such as past trajectories, user calendar of imminent meetings, etc.

A sampling rate of at least one orientation sensor(s) is automatically adjusted, based on the expected change in movement (640). Automatically adjusting the sampling rate can include, for example, selecting and implementing a sampling strategy from a selection of available sampling strategies that can provide adequate sampling information for the expected change in movement. For example, a sampling strategy in which an expected change in movement is a turn in one of many directions could include sampling the accelerometer at 30 Hz and sampling a camera at 20 Hz. An example strategy in which an expected change in movement is a turn in one of four directions could include sampling the accelerometer at 30 Hz and sampling a gyroscope at 50 Hz. An example strategy in which an expected change in movement is a turn in one of two directions could include sampling the accelerometer at 20 Hz and sampling a magnetometer at 10 Hz. As indicated above, numerous of sampling strategies can be available for any particular expected change in movement.

It should be appreciated that the specific steps illustrated in FIG. 6 provide an example process 600 for adaptively adjusting orientation sensor sampling of a mobile device in a positioning system. Alternative embodiments may include alterations to the embodiments shown. Furthermore, additional features may be added or removed depending on the particular applications. For example, embodiments may include receiving, with the mobile device, the location information (e.g., map data) sent by a server. Additionally or alternatively, embodiments may include updating the location information based on historical information regarding the mobile device (i.e., self-sourcing) and/or information from at least one other mobile device (i.e., crowd sourcing). One of ordinary skill in the art would recognize many variations, modifications, and alternatives.

Figure 7:
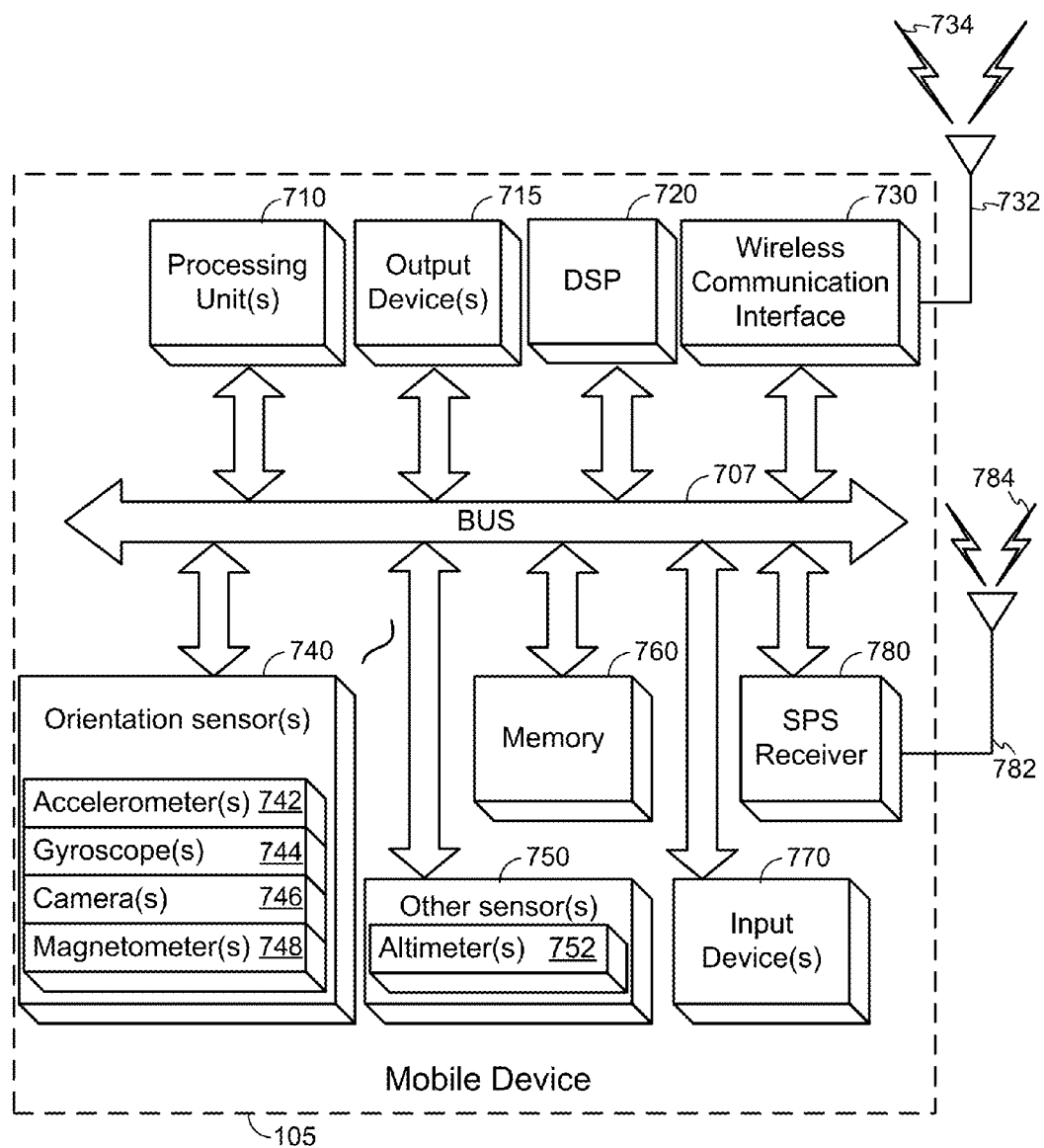
FIG. 7 illustrates an embodiment of a mobile device.

FIG. 7 illustrates an embodiment of a mobile device 105, which can be utilized in the positioning system 100 of FIG. 1, and/or that can be configured to perform the methods provided by various other embodiments, such as those described in relation to FIGS. 5 and 6. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

It can also be noted that some or all of the components of the mobile device 105 shown in FIG. 7 can be utilized in other computing systems described herein, such as location server(s), map server(s), and/or access point(s) 130 of FIG. 1. In these other systems, as well as the mobile device 105, it can be noted that components illustrated by FIG. 7 can be localized to a single device and/or distributed among various networked devices, which may be disposed at different physical locations.

The mobile device 105 is shown comprising hardware elements that can be electrically coupled via a bus 707 (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein, including methods illustrated in FIGS. 5 and 6. As shown in FIG. 7, some embodiments may have a separate DSP 720, depending on desired functionality. The mobile device 105 also can include one or more input devices 770, which can include without limitation a touch screen, a touch pad, microphone, button(s), dial(s), switch(es), and/or the like; and one or more output devices 715, which can include without limitation a display, light emitting diode (LED), speakers, and/or the like.

The mobile device 105 might also include a wireless communication interface 730, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities (as described above), etc.), and/or the like. The wireless communication interface 730 may permit data to be exchanged with a network (such as the Internet 150 and/or mobile network provider 140 of FIG. 1), other computer systems, and/or any other electronic devices described herein. The communication can be carried out via one or more wireless communication antenna(s) 732 that send and/or receive wireless signals 734. Depending on desired functionality, the mobile device 105 can include separate transceivers to communicate with base transceiver stations (e.g., base transceiver station(s) 120 of FIG. 1) and access points (e.g., access point(s) 130 of FIG. 1).

The mobile device 105 can further include orientation sensor(s) 740. As indicated herein, orientation sensors can include sensors from which an orientation of the mobile device 105 can be determined. Such sensors can include, without limitation, one or more accelerometer(s) 742, gyroscope(s) 744, camera(s) 746, magnetometer(s) 748, and the like. These orientation sensor(s) 740 can correspond to the accelerometer(s) 230, gyroscope(s) 210, camera(s) 240, and magnetometer(s) 220 shown in FIG. 2 and described previously. The mobile device 105 may further include other sensor(s) 750 such as one or more altimeter(s) 752, as described above. Moreover, other sensor(s) 750 also can include sensor(s) not shown in FIG. 7, such as microphone(s), proximity sensor(s), light sensor(s), and the like.

Embodiments of the mobile device may also include an SPS receiver 780 capable of receiving signals 784 from one or more SPS satellites (such as the SPS satellites 110 of FIG. 1) using an SPS antenna 782.

The mobile device 105 may further include (and/or be in communication with) a memory 760. The memory 760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as those described in relation to FIGS. 5 and 6, might be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the mobile device 105) to perform methods in accordance with various embodiments of the invention. According to a set of embodiments, some or all of the procedures of such methods are performed by the mobile device 105 in response to processing unit(s) 710 executing one or more sequences of one or more instructions (which might be incorporated into an operating system and/or other code) contained in the memory 760. Merely by way of example, execution of the sequences of instructions contained in the memory 760 might cause the processing unit(s) 710 to perform one or more procedures of the methods described herein. Additionally or alternatively, portions of the methods described herein may be executed through specialized hardware.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for adaptively adjusting orientation sensor sampling of a mobile device in a positioning system, the method comprising:
   determining a location of the mobile device;
   determining a direction in which the mobile device moves;
   determining an expected change in movement based on:
      the determined location, and
      the determined direction; and
   adjusting, with a processing unit, a sampling rate of at least one orientation sensor of the mobile device based on the expected change in movement.

2. The method of claim 1, further comprising
choosing an option from a plurality of options for adjusting the sampling rate, wherein adjusting the sampling rate comprises adjusting the sampling rate of the at least one orientation sensor based on the chosen option.

3. The method of claim 2, wherein choosing the option is based on at least one of:
a heading of the mobile device,
a time of day,
a determined battery level of the mobile device, or
a minimum required accuracy level of the at least one orientation sensor.

4. The method of claim 1, wherein the at least one orientation sensor comprises at least one of:
a gyroscope,
a magnetometer,
an accelerometer, or
a camera.

5. The method of claim 1, further comprising adjusting a sampling rate of an altimeter based on the expected change in movement.

6. The method of claim 1, wherein determining the expected change in movement is further based on information associated with the determined location.

7. The method of claim 6, wherein the information associated with the determined location comprises at least one of:
an expected activity engaged in by a user of the mobile device,
a location type, or
one or more physical boundaries associated with the determined location.

8. The method of claim 7, wherein the expected activity engaged in by the user is based on either or both of:
historical information regarding the mobile device, or
information from at least one other mobile device.

9. The method of claim 6, wherein the information associated with the determined location is sent by a server and received by the mobile device.

10. The method of claim 1, wherein adjusting the sampling rate of at least one orientation sensor comprises at least one of:
reducing the sampling rate of an orientation sensor,
increasing the sampling rate of an orientation sensor,
stopping the sampling of an orientation sensor, or
starting sampling of an orientation sensor.

11. The method of claim 1, wherein determining the location of the mobile device includes taking measurements of either or both of round trip time (RTT) or received signal strength indication (RSSI).

12. A mobile device configured to adaptively adjust orientation sensor sampling for position determination, the mobile device comprising:
at least one orientation sensor;
a wireless communication interface;
a memory; and
a processing unit, communicatively coupled with the at least one orientation sensor, the wireless communication interface, and the memory, the processing unit configured to:
determine a location of the mobile device;
determine a direction in which the mobile device moves;
determine an expected change in movement based on:
the determined location, and
the determined direction; and
adjust a sampling rate of the at least one orientation sensor of the mobile device based on the expected change in movement.

13. The mobile device of claim 12, wherein the processing unit is further configured to
choose an option from a plurality of options for adjusting the sampling rate,
wherein adjusting the sampling rate comprises adjusting the sampling rate of the at least one orientation sensor based on the chosen option.

14. The mobile device of claim 13, wherein the processing unit is configured to choose the option based on at least one of:
a heading of the mobile device,
a time of day,
a determined battery level of the mobile device, or
a minimum required accuracy level of the at least one orientation sensor.

15. The mobile device of claim 12, wherein the at least one orientation sensor comprises at least one of:
a gyroscope,
a magnetometer,
an accelerometer, or
a camera.

16. The mobile device of claim 12, further comprising an altimeter, wherein the processing unit is further configured to adjusting a sampling rate of the altimeter based on the expected change in movement.

17. The mobile device of claim 12, wherein the processing unit is configured to determine the expected change in movement further based on information associated with the determined location.

18. The mobile device of claim 17, wherein the processing unit is configured to determine, from the information associated with the determined location, at least one of:
an expected activity engaged in by a user of the mobile device,
a location type, or
one or more physical boundaries associated with the determined location.

19. The mobile device of claim 18, wherein the expected activity engaged in by the user is based on historical information, stored in the memory, regarding the mobile device.

20. The mobile device of claim 17, wherein the processing unit is further configured to receive the information associated with the determined location via the wireless communication interface.

21. The mobile device of claim 12, wherein the processing unit is configured to adjust the sampling rate of at least one orientation sensor by doing at least one of:
reducing the sampling rate of an orientation sensor,
increasing the sampling rate of an orientation sensor,
stopping the sampling of an orientation sensor, or
starting sampling of an orientation sensor.

22. The mobile device of claim 12, wherein the processing unit is configured to us the wireless communication interface to determine the location of the mobile device by taking either or both of round trip time (RTT) measurements or received signal strength indication (RSSI) measurements.

23. A non-transitory computer readable medium having instructions stored thereon for causing a processing unit to:
determine a location of a mobile device;
determine a direction in which the mobile device moves;
determine an expected change in movement based on:
the determined location, and
the determined direction; and
adjust a sampling rate of at least one orientation sensor of the mobile device based on the expected change in movement.

24. The non-transitory computer readable medium of claim 23, further comprising instructions for causing the processing unit to
choose an option from a plurality of options for adjusting the sampling rate, wherein adjusting the sampling rate comprises adjusting the sampling rate of the at least one orientation sensor based on the chosen option.

25. The non-transitory computer readable medium of claim 24, wherein choosing the option is based on at least one of:
a heading of the mobile device,
a time of day,
a determined battery level of the mobile device, or
a minimum required accuracy level of the at least one orientation sensor.

26. The non-transitory computer readable medium of claim 23, wherein the instructions for causing the processing unit to adjust the sampling rate of the at least one orientation sensor include instructions for causing the processing unit to adjust the sampling rate of at least one of:
a gyroscope,
a magnetometer,
an accelerometer, or
a camera.

27. The non-transitory computer readable medium of claim 23, further comprising instructions for causing the processing unit to adjust a sampling rate of an altimeter based on the expected change in movement.

28. The non-transitory computer readable medium of claim 23, wherein the instructions for determining the expected change in movement include instructions for basing the determining on information associated with the determined location.

29. The non-transitory computer readable medium of claim 28, further comprising instructions for causing the processing unit to determine, from the information associated with the determined location, at least one of:
an expected activity engaged in by a user of the mobile device,
a location type, or
one or more physical boundaries associated with the determined location.

30. The non-transitory computer readable medium of claim 28, further comprising instructions for causing the processing unit to update the information associated with the determined location based on either or both of:
historical information regarding the mobile device, or
information from at least one other mobile device.

31. The non-transitory computer readable medium of claim 28, further comprising instructions for causing the processing unit to obtain the information associated with the determined location via a wireless communication interface.

32. The non-transitory computer readable medium of claim 23, wherein the instructions for causing the processing unit to adjust the sampling rate of at least one orientation sensor comprises instructions for causing the processing unit to do at least one of:
reduce the sampling rate of an orientation sensor,
increase the sampling rate of an orientation sensor,
stop the sampling of an orientation sensor, or
start sampling of an orientation sensor.

33. The non-transitory computer readable medium of claim 23, wherein the instructions for causing the processing unit to determine the location of the mobile device includes instructions for causing the processing unit to take measurements of either or both of round trip time (RTT) or received signal strength indication (RSSI).

34. A system for adaptively adjusting orientation sensor sampling of a mobile device in a positioning system, the system comprising:
means for determining a location of the mobile device;
means for determining a direction in which the mobile device moves;
means for determining an expected change in movement based on:
the determined location, and
the determined direction; and
means for adjusting a sampling rate of at least one orientation sensor of the mobile device based on the expected change in movement.

35. The system of claim 34, further comprising means for choosing an option from a plurality of options for adjusting the sampling rate, wherein the means for adjusting the sampling rate comprise means for adjusting the sampling rate of the at least one orientation sensor based on the chosen option.

36. The system of claim 35, wherein the means for choosing the option are configured to base the choosing on at least one of:
a heading of the mobile device,
a time of day,
a determined battery level of the mobile device, or
a minimum required accuracy level of the at least one orientation sensor.

37. The system of claim 34, wherein the means for adjusting a sampling rate of at least one orientation sensor comprise means for adjusting a sampling rate of at least one of:
a gyroscope,
a magnetometer,
an accelerometer, or
a camera.

38. The system of claim 34, further comprising means for adjusting a sampling rate of an altimeter based on the expected change in movement.

39. The system of claim 34, wherein the means for determining the expected change in movement includes means for basing the determining on information associated with the determined location.

40. The system of claim 39, further comprising means for determining, from the information associated with the determined location, at least one of:
an expected activity engaged in by a user of the mobile device,
a location type, or
one or more physical boundaries associated with the determined location.

41. The system of claim 40, further comprising means for updating the information associated with the determined location based on either or both of:
historical information regarding the mobile device, or
information from at least one other mobile device.

42. The system of claim 39, further comprising means for obtaining the information associated with the determined location via a wireless communication interface.

43. The system of claim 34, wherein the means for adjusting the sampling rate of at least one orientation sensor comprise means for doing at least one of:
reducing the sampling rate of an orientation sensor,
increasing the sampling rate of an orientation sensor,
stopping the sampling of an orientation sensor, or
starting sampling of an orientation sensor.

44. The system of claim 34, wherein the means for determining the location of the mobile device includes means for taking measurements of either or both of round trip time (RTT) or received signal strength indication (RSSI).

* * * * *